(12) United States Patent
Jones et al.

(10) Patent No.: US 12,561,355 B2
(45) Date of Patent: Feb. 24, 2026

(54) SYSTEMS AND METHODS FOR AUTOMATED IDENTIFICATION OF EMERGING TRENDS

(71) Applicant: JPMORGAN CHASE BANK, N.A., New York, NY (US)

(72) Inventors: John Jones, Hastings-on-Hudson, NY (US); Nathan-Daniel Millar, Glasgow (GB); Michelle Puyane, Manhattan, NY (US); Reva Shakti, Jersey City, NJ (US); Tsveti Popova, Glasgow (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 210 days.

(21) Appl. No.: 18/493,725

(22) Filed: Oct. 24, 2023

(65) Prior Publication Data

US 2025/0131025 A1 Apr. 24, 2025

(51) Int. Cl.
| | |
|---|---|
| *G06F 17/00* | (2019.01) |
| *G06F 16/334* | (2025.01) |
| *G06F 40/20* | (2020.01) |

(52) U.S. Cl.
CPC .......... *G06F 16/3344* (2019.01); *G06F 40/20* (2020.01)

(58) Field of Classification Search
CPC .... G06F 16/3344; G06F 16/36; G06F 16/355; G06F 40/20; G06N 20/00
See application file for complete search history.

(56) References Cited

U.S. PATENT DOCUMENTS

| | | | |
|---|---|---|---|
| 8,380,511 B2 * | 2/2013 | Cave | G10L 15/1815 |
| | | | 704/238 |
| 8,484,014 B2 * | 7/2013 | Liu | G06F 16/3344 |
| | | | 704/7 |

(Continued)

FOREIGN PATENT DOCUMENTS

| | | | | |
|---|---|---|---|---|
| CN | 108614814 B | * | 2/2022 | G06F 18/22 |
| CN | 114090698 A | * | 2/2022 | G06F 18/214 |

(Continued)

OTHER PUBLICATIONS

Muhlroth, Christian, et al, "Artificial Intelligence in Innovation: How to Spot Emerging Trends and Technologies", IEEE Transactions on Engineering Management, IEEE, vol. 69, No. 2, May 27, 2020, pp. 493-510. (Year: 2020).*

(Continued)

*Primary Examiner* — Laurie A Ries
(74) *Attorney, Agent, or Firm* — GREENBERG TRAURIG LLP

(57) ABSTRACT

Systems and methods for automated identification of emerging trends are disclosed. A method may include: (1) receiving, by a computer program executed on an electronic device, a plurality of documents; (2) training, by the computer program, a proximity model to identify word pairs in each of the plurality of documents, wherein the word pairs comprise two words within a predetermined distance of each other at a predetermined frequency in the plurality of documents; (3) identifying, by the computer program and using the proximity model, trends involving the word pairs, wherein the trends are based on a frequency that the word pairs appear in the plurality of documents and/or a velocity at which the word pairs appear in the plurality of documents over a period of time; and (4) outputting, by the computer (Continued)

program, the word pairs and the trends to a downstream system.

20 Claims, 3 Drawing Sheets

(56) References Cited

U.S. PATENT DOCUMENTS

| | | | | |
|---|---|---|---|---|
| 9,442,928 | B2 * | 9/2016 | Szucs | G06F 16/94 |
| 10,042,880 | B1 * | 8/2018 | Bodapati | G06N 20/20 |
| 10,224,036 | B2 * | 3/2019 | Lindle | G06F 18/28 |
| 11,775,596 | B1 * | 10/2023 | Joshi | G06F 16/951 |
| | | | | 707/738 |
| 12,367,338 | B2 * | 7/2025 | Rani | G06F 40/30 |
| 12,431,138 | B2 * | 9/2025 | Carbune | G10L 15/1822 |
| 2006/0010145 | A1 * | 1/2006 | Al-Kofahi | G06F 18/254 |
| 2011/0202332 | A1 * | 8/2011 | Abir | G06F 16/30 |
| | | | | 704/4 |
| 2011/0202512 | A1 * | 8/2011 | Pantanelli | G06F 40/247 |
| | | | | 707/706 |
| 2017/0270425 | A1 * | 9/2017 | Danson | G06F 40/279 |
| 2019/0325247 | A1 * | 10/2019 | Ordonez | G06V 30/15 |
| 2020/0387570 | A1 * | 12/2020 | Biswas | G06F 40/30 |
| 2022/0019741 | A1 * | 1/2022 | Roy | G06F 40/30 |
| 2023/0267139 | A1 | 8/2023 | Alexandrov et al. | |
| 2023/0385685 | A1 * | 11/2023 | Allouche | G06N 20/00 |
| 2024/0086431 | A1 * | 3/2024 | Guberman | G06Q 50/18 |
| 2024/0152541 | A1 * | 5/2024 | Zhu | G06F 16/358 |
| 2024/0176950 | A1 * | 5/2024 | Rani | G06Q 30/0282 |
| 2024/0211701 | A1 * | 6/2024 | Haikin | G06F 40/279 |
| 2024/0378382 | A1 * | 11/2024 | Connor | G06F 40/253 |
| 2025/0165536 | A1 * | 5/2025 | Wang | G06F 16/906 |
| 2025/0190459 | A1 * | 6/2025 | Conway | G06N 3/0475 |

FOREIGN PATENT DOCUMENTS

| | | | | | |
|---|---|---|---|---|---|
| CN | 112329460 | B | * | 7/2023 | G06F 40/289 |
| CN | 111460787 | B | * | 9/2023 | |
| WO | WO-2019204252 | A1 | * | 10/2019 | G06F 40/35 |

OTHER PUBLICATIONS

Extended European Search Report, dated Feb. 18, 2025, from corresponding European Patent Application No. 24208571.0.

Muhlroth, Christian; et al. "Artificial Intelligence in Innovation: How to Spot Emerging Trends and Technologies", IEEE Transactions on Engineering Management, IEEE, vol. 69, No. 2, May 27, 2020 (May 27, 2020), pp. 493-510.

Nguyen, Nhu Khoa; et al. "Contextualizing Emerging Trends in Financial News Articles", arxiv.org, Cornell University Library, Olin Library Cornell University Ithaca, NY 14853, Jan. 20, 2023 (Jan. 20, 2023).

Dridi, Amna; et al. "Leap2Trend: Temporal Word Embedding Approach for Instant Detection of Emerging Scientific Trends", IEEE Access, vol. 7, Dec. 3, 2019 (Dec. 3, 2019).

* cited by examiner

SYSTEMS AND METHODS FOR AUTOMATED IDENTIFICATION OF EMERGING TRENDS

BACKGROUND OF THE INVENTION

1. Field of the Invention

Embodiments relate to systems and methods for automated identification of emerging trends.

2. Description of the Related Art

Identifying emerging trends is an activity most businesses are engaged in—making sense of what is happening in the world by searching websites, social media, industry publications and a list of other sources. Emerging trends, however, are difficult to identify unless part of the trend is already known.

SUMMARY OF THE INVENTION

Systems and methods for automated identification of emerging trends are disclosed. According to an embodiment, a method for automated identification of emerging trends may include: (1) receiving, by a computer program executed on an electronic device, a plurality of documents; (2) training, by the computer program, a proximity model to identify word pairs in each of the plurality of documents, wherein the word pairs comprise two words within a predetermined distance of each other at a predetermined frequency in the plurality of documents; (3) identifying, by the computer program and using the proximity model, trends involving the word pairs, wherein the trends are based on a frequency that the word pairs appear in the plurality of documents and/or a velocity at which the word pairs appear in the plurality of documents over a period of time; and (4) outputting, by the computer program, the word pairs and the trends to a downstream system.

In one embodiment, the plurality of documents may include publications, web pages, articles, and/or news streams.

In one embodiment, the plurality of documents may include call logs and/or chat logs.

In one embodiment, the plurality of documents may include text that was converted from audio.

In one embodiment, the word pairs may be identified within a predetermined range of each other.

In one embodiment, each of the word pairs may include an anchor word and a second word that may be within the predetermined distance of the anchor word.

In one embodiment, the method may also include identifying, by the computer program, a word that is a result of one of the word pairs merging.

According to another embodiment, a system may include: a source of a plurality of documents; a pivot word database comprising a plurality of pivot words; a word pair database; a downstream system; and an electronic device executing a computer program that is configured to receive the plurality of documents from the source, train a proximity model to identify word pairs in each of the plurality of documents, wherein the word pairs comprise two words within a predetermined distance of each other at a predetermined frequency in the plurality of documents, store the word pairs in the word pair database, identify, using the proximity model, trends involving the word pairs, wherein the trends are based on a frequency that the word pairs appear in the plurality of documents and/or a velocity at which the word pairs appear in the plurality of documents over a period of time, and output the word pairs and the trends to the downstream system.

In one embodiment, the plurality of documents may include publications, web pages, articles, and/or news streams.

In one embodiment, the plurality of documents may include call logs and/or chat logs.

In one embodiment, the plurality of documents may include text that was converted from audio.

In one embodiment, the word pairs may be identified within a predetermined range of each other.

In one embodiment, each of the word pairs may include an anchor word and a second word that may be within the predetermined distance of the anchor word.

In one embodiment, the computer program may be further configured to identify a word that is a result of one of the word pairs merging.

According to another embodiment, a non-transitory computer readable storage medium may include instructions stored thereon, which when read and executed by one or more computer processors, cause the one or more computer processors to perform steps comprising: receiving a plurality of documents; training a proximity model to identify word pairs in each of the plurality of documents, wherein the word pairs comprise two words within a predetermined distance of each other at a predetermined frequency in the plurality of documents; identifying, using the proximity model, trends involving the word pairs, wherein the trends are based on a frequency that the word pairs appear in the plurality of documents and/or a velocity at which the word pairs appear in the plurality of documents over a period of time; and outputting the word pairs and the trends to a downstream system.

In one embodiment, the plurality of documents may include publications, web pages, articles, news streams, call logs and/or chat logs.

In one embodiment, the plurality of documents may include text that was converted from audio.

In one embodiment, the word pairs may be identified within a predetermined range of each other.

In one embodiment, each of the word pairs may include an anchor word and a second word that may be within the predetermined distance of the anchor word.

In one embodiment, the non-transitory computer readable storage medium may also include instructions stored thereon, which when read and executed by one or more computer processors, cause the one or more computer processors to identify a word that is a result of one of the word pairs merging.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
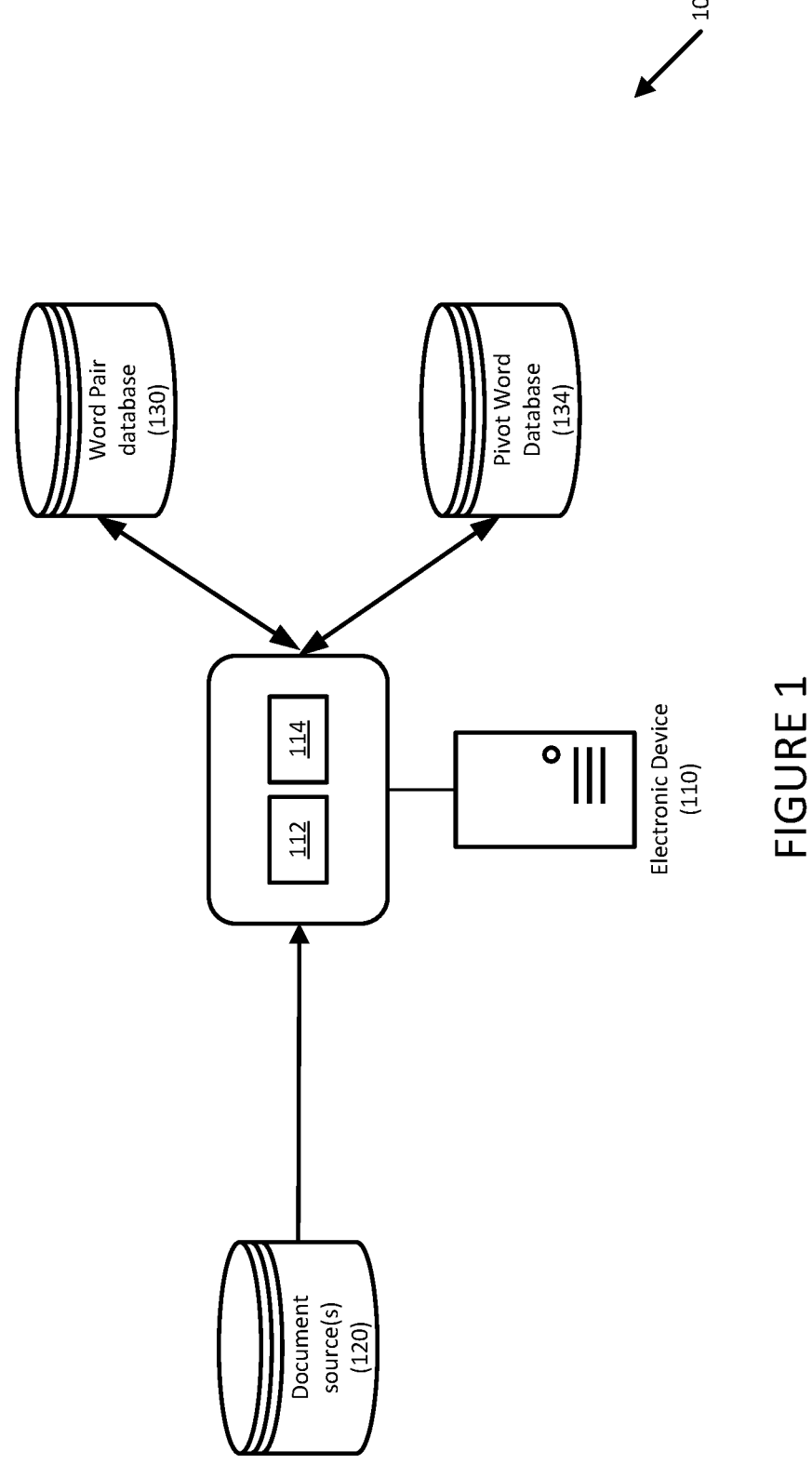
FIG. 1 illustrates a system for automated identification of emerging trends according to an embodiment.

Embodiments relate to systems and methods for automated identification of emerging trends.

Embodiments may identify emerging trends based on the presence of words or groups of words in documents. Embodiments may also detect the movement of words over time to reveal where a trend may be headed.

As words appear close to each other, and sometimes form new words, the words may reveal established pairs, current trends, themes, and emerging trends. The anatomy of the eye can focus on only a few words with clarity—the span is about 4 to 5 words across in a book at a normal reading distance—at which point the eye moves across the line when reading. Using this range, embodiments may review documents to identify what is likely to become a new idea, theme, or trend in the future. The frequency of word pairs and word proximity within the range shows when the word pairs become connected to each other.

For example, established word pairs may be word pairs that have been active for years but are starting to separate (e.g., autonomous organizations, electric light). Emerging industries may be established word pairs and terms that have been recently connected, such as autonomous vehicle and electric car. Emerging trends may be word pairs that have become active recently, such as autonomous ride sharing and electric minivan. Trending pairs may be word pairs that are not less frequent than established word pairs but are increasing in frequency, such as autonomous policies and electric shoes.

Once the proximity model has been trained, additional industry context, such as financial services, retail, etc. may be added to provide additional context for where the future trend might be appearing. This may also assist in associating the pair with the correct industry.

For example, each industry may be associated with "pivot" words. The pivot words, which are words that are central to an industry and can be joined with a second word, which reveal the trend—"climate"+"change" or "climate"+"regulation". The first word is an anchor and embodiments "pivot" forward and backward to look for other terms moving toward the pivot work. Embodiments may look for pivot words and other nouns inside and outside of the range. These pivot words may create their own word pairs, or may create an environment where new pairs may be identified.

In one embodiment, pivot words may be provided by subject matter experts. In another embodiment, pivot words may be identified from keywords or categories for the document or article being scanned. The pivot words may then be used with machine learning for further coverage across documents and articles.

In the financial services industry, examples of pivot words may include Finance, Assets, Transactions, Bank, and Compliance. For example, if the range includes one of the pivot terms associated with a word pair, this may reveal a new potential trend.

Word pairs and industry associations may be used to identify emerging future trends, possible trends, and even future ideas. We can identify word pairs far from each other, not inside the range, etc. which may identify future ideas.

Embodiments may further identify new words, such as a combination of word pairs into a single word. Examples include "FinTech" (Financial Service Technology), "RegTech" (Regulatory Technology), etc. Embodiments may track trends back to the separated word and continue to search for the joined words as a single unit—this tracking may also identify when a trend slows down.

Embodiments may be used to identify relevant trends and concepts for study, to identify un-trending and trending of areas of interest for investing, to identify future trends and future ideas based on word proximity, etc. For example, the proximity model may be used with research tools, artificial intelligence content generation tools, news reader applications, news aggregators, etc. For example, a user may be presented with an emerging trend, and the proximity model may be used to identify and present news articles that are related to that trend.

Referring to FIG. 1, a system for automated identification of emerging trends is disclosed according to an embodiment. System 100 may include user electronic device 110 that may execute computer program 112 and proximity model 114. Electronic device 110 may include any suitable electronic device, including servers (e.g., physical and/or cloud-based), computers (e.g., workstations, desktops, laptops, tablets, etc.), smart devices (e.g., smart phones, smart watches, etc.), IoT appliances, etc. Computer program 112 may receive documents from document source 120, which may be any suitable source of document. Examples of documents include publications, web content, articles, newsfeeds, social media content, call logs, chat logs, spoken word transcripts, etc.

Proximity model 114 may be trained by computer program 112 to analyze text of the documents to identify word pairs within a certain range. In one embodiment, a range of five words may be used; other ranges may be used as is necessary and/or desired. In one embodiment, computer program 112 may use pivot words from pivot word database 134, which may be standard industry terms, to identify the word pairs.

Proximity model 114 may store the word pairs in word pair database 130.

Proximity model 114 may be trained by identifying the word pairs, the frequency of the word pairs and the distance of "paired" word from the "pivot" word. The frequency and distance may be measured over time to identify the trending of the pairs.

Once proximity model 114 is trained to identify word pairs, it may identify a type of trend associated with the word pair. This may be based, for example, on the frequency with which the word pairs are used, the velocity of the word pair use, etc.

Figure 2:
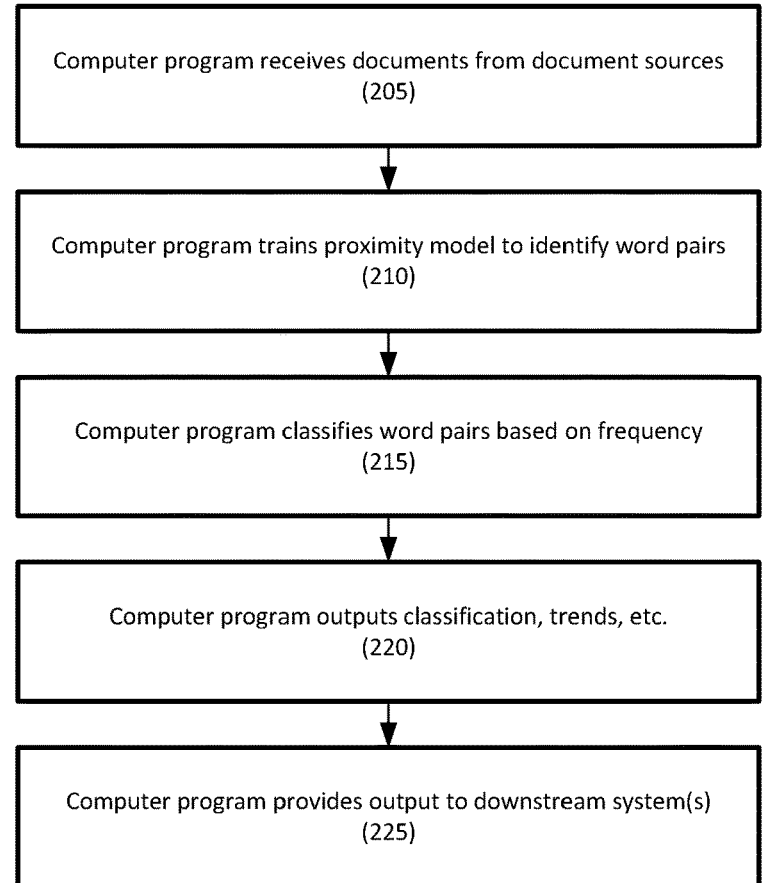
FIG. 2 illustrates a method for automated identification of emerging trends according to an embodiment.

Referring to FIG. 2, a method for automated identification of emerging trends is disclosed according to an embodiment.

In step 205, a computer program executed on a user electronic device may receive documents from document sources. For example, the computer program may receive publications, web pages, articles, news streams, etc. If necessary, the computer program may convert audio to text.

In step 210, the computer program may train a proximity model to identify word pairs in the documents. For example, embodiments may identify a high-frequency word in the document as the "anchor" and then measure the distance of each relevant word from the "anchor"—relevant words avoid articles, prepositions and other "stop words"—the distance of the second word from the anchor determines the "score" of the pair and the frequency across multiple documents determines the trend.

In step 215, using the proximity model, the computer program may identify trends for the word pairs based on, for example, frequency, velocity, etc. For example, the word pairs may identify established word pairs, emerging industries, emerging trends, trending pairs, etc.

In step 220, the computer program may output the word pairs, classifications, etc.

In step 225, the computer program may provide the word pairs and/or the proximity model to one or more downstream systems. For example, the downstream systems may include research tools, artificial intelligence content generation tools, news reader applications, news aggregators, etc. For example, using a selection of a trend, a downstream system may use the proximity model may be used to identify and present news articles or similar that are related to that trend. As another example, using the proximity model, a downstream system may identify companies associated with a trend.

In one embodiment, the proximity model, with other trained machine learning models, may be used to determine the relevance of documents, articles, etc.

Figure 3:
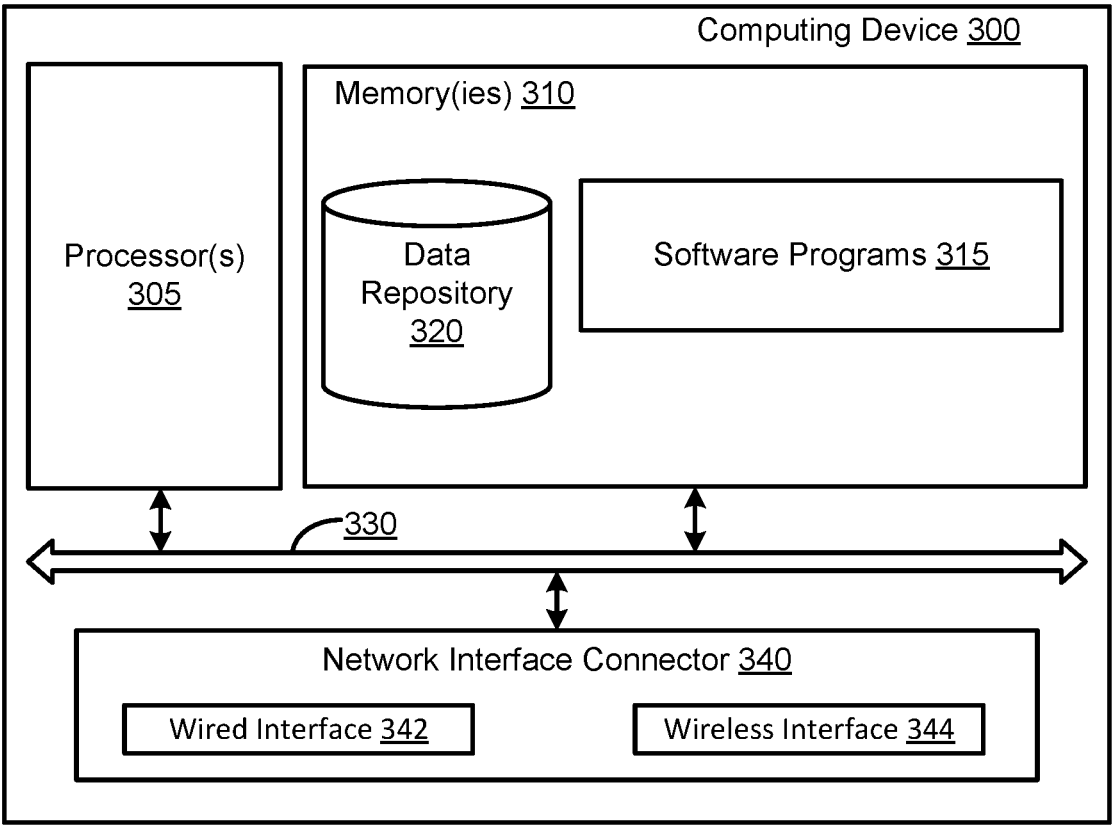
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automated identification of emerging trends, comprising:
  receiving, by a computer program executed on an electronic device, a plurality of documents;
  training, by the computer program, a proximity model to identify word pairs in each of the plurality of documents, wherein the word pairs comprise two words within a predetermined distance of each other at a predetermined frequency in the plurality of documents;
  identifying, by the computer program and using the proximity model, trends involving the word pairs, wherein the trends are based on a frequency that the word pairs appear in the plurality of documents and/or a velocity at which the word pairs appear in the plurality of documents over a period of time; and
  outputting, by the computer program, the word pairs and the trends to a downstream system.

2. The method of claim 1, wherein the plurality of documents comprise publications, web pages, articles, and/or news streams.

3. The method of claim 1, wherein the plurality of documents comprise call logs and/or chat logs.

4. The method of claim 1, wherein the plurality of documents comprise text that was converted from audio.

5. The method of claim 1, wherein the word pairs are identified with a predetermined range of each other.

6. The method of claim 1, wherein each of the word pairs comprise an anchor word and a second word that is within the predetermined distance of the anchor word.

7. The method of claim 1, further comprising:

identifying, by the computer program, a word that is a result of one of the word pairs merging.

8. A system, comprising:

a source of a plurality of documents;

a pivot word database comprising a plurality of pivot words;

a word pair database;

a downstream system; and an electronic device executing a computer program that is configured to receive the plurality of documents from the source, train a proximity model to identify word pairs in each of the plurality of documents, wherein the word pairs comprise two words within a predetermined distance of each other at a predetermined frequency in the plurality of documents, store the word pairs in the word pair database, identify, using the proximity model, trends involving the word pairs, wherein the trends are based on a frequency that the word pairs appear in the plurality of documents and/or a velocity at which the word pairs appear in the plurality of documents over a period of time, and output the word pairs and the trends to the downstream system.

9. The system of claim 8, wherein the plurality of documents comprise publications, web pages, articles, and/or news streams.

10. The system of claim 8, wherein the plurality of documents comprise call logs and/or chat logs.

11. The system of claim 8, wherein the plurality of documents comprise text that was converted from audio.

12. The system of claim 8, wherein the word pairs are identified with a predetermined range of each other.

13. The system of claim 8, wherein each of the word pairs comprise an anchor word and a second word that is within the predetermined distance of the anchor word.

14. The system of claim 8, wherein the computer program is further configured to identify a word that is a result of one of the word pairs merging.

15. A non-transitory computer readable storage medium, including instructions stored thereon, which when read and executed by one or more computer processors, cause the one or more computer processors to perform steps comprising:

receiving a plurality of documents;

training a proximity model to identify word pairs in each of the plurality of documents, wherein the word pairs comprise two words within a predetermined distance of each other at a predetermined frequency in the plurality of documents;

identifying, using the proximity model, trends involving the word pairs, wherein the trends are based on a frequency that the word pairs appear in the plurality of documents and/or a velocity at which the word pairs appear in the plurality of documents over a period of time; and outputting the word pairs and the trends to a downstream system.

16. The non-transitory computer readable storage medium of claim 15, wherein the plurality of documents comprise publications, web pages, articles, news streams, call logs and/or chat logs.

17. The non-transitory computer readable storage medium of claim 15, wherein the plurality of documents comprise text that was converted from audio.

18. The non-transitory computer readable storage medium of claim 15, wherein the word pairs are identified with a predetermined range of each other.

19. The non-transitory computer readable storage medium of claim 15, wherein each of the word pairs comprise an anchor word and a second word that is within the predetermined distance of the anchor word.

20. The non-transitory computer readable storage medium of claim 15, further including instructions stored thereon, which when read and executed by one or more computer processors, cause the one or more computer processors to perform steps comprising:

identifying a word that is a result of one of the word pairs merging.

* * * * *